United States Patent
Holmgren et al.

(10) Patent No.: US 7,293,886 B2
(45) Date of Patent: Nov. 13, 2007

(54) STRAY-LIGHT REDUCING DEVICE FOR AN OPTICAL SYSTEM

(75) Inventors: Olof Holmgren, Solna (SE); Ann-Cathrine Wernolf, Lidingo (SE)

(73) Assignee: FLIR Systems AB, SEX ( * ) Notice: Subject to any disclaimer, the term of this patent is extended or adjusted under 35 U.S.C. 154(b) by 391 days.

(21) Appl. No.: 10/482,577

(22) PCT Filed: Jun. 19, 2002

(86) PCT No.: PCT/SE02/01190
§ 371 (c)(1),
(2), (4) Date: Jun. 21, 2004

(87) PCT Pub. No.: WO03/003077
PCT Pub. Date: Jan. 9, 2003

(65) Prior Publication Data
US 2005/0002104 A1    Jan. 6, 2005

(30) Foreign Application Priority Data
Jun. 29, 2001    (SE) ................................ 0102332

(51) Int. Cl.
*G02B 27/00*    (2006.01)
(52) U.S. Cl. ..................................... 359/614; 362/346

(58) Field of Classification Search ................ 359/613
See application file for complete search history.

(56) References Cited

U.S. PATENT DOCUMENTS

| 3,698,797 A * | 10/1972 | Brown et al. ............... 359/503 |
| 4,377,752 A | 3/1983 | Sano et al. |
| 5,745,293 A * | 4/1998 | Lassalle ....................... 359/614 |
| 5,748,816 A * | 5/1998 | Jaksic et al. .................. 385/39 |
| 6,758,568 B2 * | 7/2004 | Valenti ....................... 359/614 |

FOREIGN PATENT DOCUMENTS

WO    WO-0042420    7/2000

\* cited by examiner

*Primary Examiner*—Stephone B. Allen
*Assistant Examiner*—Derek S. Chapel
(74) *Attorney, Agent, or Firm*—Connolly Bove Lodge & Hutz LLP

(57) ABSTRACT

A device is part of an optical system (1) that works with an intermediate image and comprises stop(5) with associated aperture (6). The device comprises a light-reducing or light-absorbing arrangement (12) located at the side of the aperture. The arrangement is arranged to reduce considerably or eliminate completely light (11) incident to the side of the aperture, and thereby considerably reduce beam reflections. In this way, there is less likelihood of the optical system being detected when this is in use.

12 Claims, 2 Drawing Sheets

STRAY-LIGHT REDUCING DEVICE FOR AN OPTICAL SYSTEM

CROSS-REFERENCE TO RELATED APPLICATIONS

This application is a National Stage Entry of PCT/SE02/01190 filed on Jun. 19, 2002, which claims priority under 35 U.S.C. §119 to Swedish Application 0102332-4, filed on Jun. 29, 2001.

BACKGROUND

This disclosure relates to a device for an optical system that works with an intermediate image and comprises a stop with an associated aperture.

In various advanced applications, for example military applications, where sights, telescopes, electro-optical TV cameras, etc are used, the use of optical systems of this type is already known. The optical system can work, for example, within the visual range and the infrared range, that is with wavelengths within the range 0.45-14 micrometres. In connection with this, reference is made to the patent literature and the known systems on the market. By light is meant in this application at least a wavelength range 0.3-30 μm, comprising visible light and such wavelengths within the ultraviolet and infrared range that can be handled by optical technology used for the visible range.

With this type of optical system there is a pronounced desire to be able to design the system in such a way that it does not reveal itself during use. The problem is here that there are difficulties in avoiding stray light and reflections that can be detected by detection equipment, for example laser radar. The invention intends to solve this problem and proposes in this respect that the stray light and reflections in question should at least be reduced considerably. In connection with this, beam-reflecting surfaces (mirror surfaces) are used in one embodiment, and there is a desire to be able to arrange these surfaces in such a way that an optical system is obtained that is exceptionally difficult to detect. The invention also intends to solve this problem.

SUMMARY

What can primarily be considered to be characteristic of a device of the type described by way of introduction is that it comprises a light-reducing and light-absorbing arrangement located to the side of the aperture, which arrangement is arranged to reduce considerably or eliminate completely light incident to the side of the aperture, and thereby considerably reduce or eliminate the effects of stray light and reflections.

In one embodiment, the light-reducing or light-absorbing arrangement comprises a light-reflecting surface arrangement with a surface coating or surface coatings that give low reflection of the light incident to the side of the aperture. For this purpose, the surface arrangement can comprise mirror surfaces set at an angle to each other that results in the reflection or reflections being obtained in controlled directions. The mirror surfaces in question can be provided with coatings that give a low reflection, the respective reflecting surfaces being arranged so that a reduction is obtained by, for example, 10-2. In one embodiment, two or more mirror surfaces are arranged so that they produce at least two or three reflections of the light incident to the side of the aperture.

The device that considerably reduces the stray light or reflections can be designed as a unit that is arranged with an opening extending centrally, the mouth of which acts as an aperture. The unit is arranged with unique characteristics and reference is hereby made to the subsidiary claims below.

By means of the device that is proposed above, a technically simple solution is obtained to the problems mentioned by way of introduction. As the invention utilizes known means and means that do not require the optical system as such to be redesigned for the implementation of the invention, economic benefits are also obtained. One and the same system can be provided with "light traps" of various designs and performance and in this way the system can be arranged for a stringent requirement concerning the elimination of stray light and reflections, or requirements that it will work with the system as such.

BRIEF DESCRIPTION OF THE DRAWINGS

A currently preferred embodiment of a device that has the significant characteristics of the invention will be described in the following with reference to the attached drawings in which.

DETAILED DESCRIPTION

Figure 1:
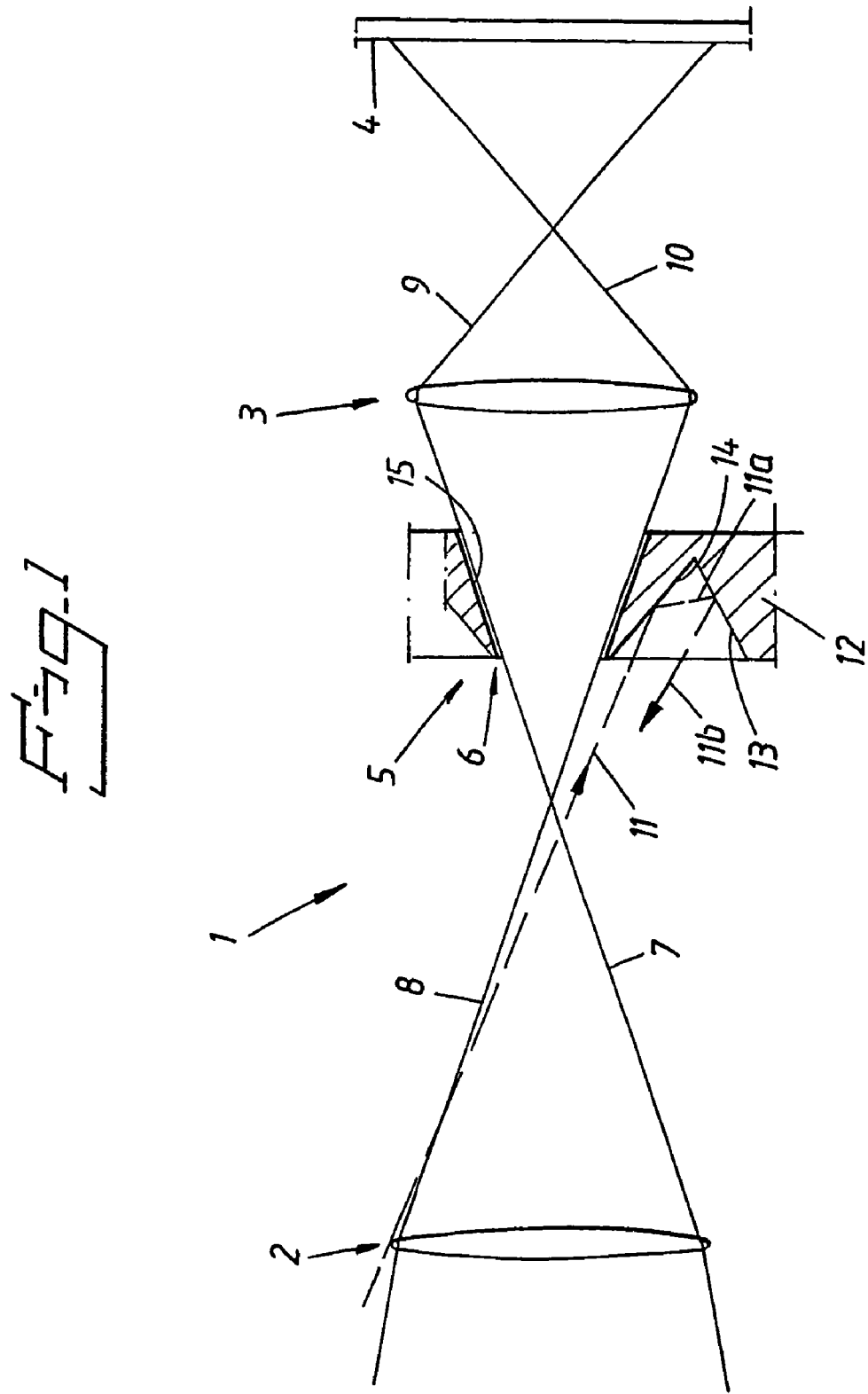
FIG. 1 shows in longitudinal section and in outline an example of an optical system with intermediate image and where a light trap is arranged in association with an aperture incorporated in the system.

In FIG. 1, an optical system with so-called intermediate image function is shown in outline by 1. The system can comprise one or more first lenses or optical elements 2 and one or more second lenses or optical elements 3. The system also comprises a detector surface 4. In addition, there is a stop function 5 that comprises an aperture 6. The ordinary and required beam path is represented by solid lines 7, 8 and 9, 10. The function and the design of this type of optical system is already well known and will therefore not be described here in greater detail.

According to the invention, an arrangement is arranged in association with the said aperture that at least considerably reduces the beam or the stray light that goes from the lens or the lens arrangement 2 to the side of the aperture 6. An example of such stray light is represented by a broken line 11 in FIG. 1. The arrangement for the reduction of the stray light 11 incident to the side of the aperture 6 comprises a unit described in greater detail below. It is characteristic of the unit 12 that it works with a mirror surface or mirror surfaces 13, 14 which in the embodiment are coated with a surface coating that considerably reduces the reflected beam. In the embodiment shown, the beam 11 is incident to a mirror surface 14, which in turn reflects the beam towards a second mirror surface 13. The said reflected components of the beam are indicated in FIG. 1 by 11a and 11b. With the reflection by the first mirror surface 14, there is thus an exceptional reduction of the beam intensity, for example a reduction by 10-2. A corresponding reduction occurs when the beam is reflected by the second mirror surface 13, which means that the beam 11b leaving the unit 12 is considerably reduced in comparison with the incident beam 11. It is recognized that the mirrors 13 and 14 can be arranged at different and suitable angles of inclination in relation to each other and in relation to the incident beam 11. In each individual design, it is thus possible to build in a level of reduction simply by the use of mirrors and their surface coatings, and also to obtain a controlled emission of the reflected beam 11b out of the unit 12. The number of surfaces can also vary and, in a preferred embodiment, a mirror arrangement is used that gives 2, 3 or more reflections in the V-shaped channel of the unit. The unit 12 is also provided with a central opening 15, at one end of which, more specifically the end facing towards the lens 2, the mouth forms the aperture 6.

Figure 2:
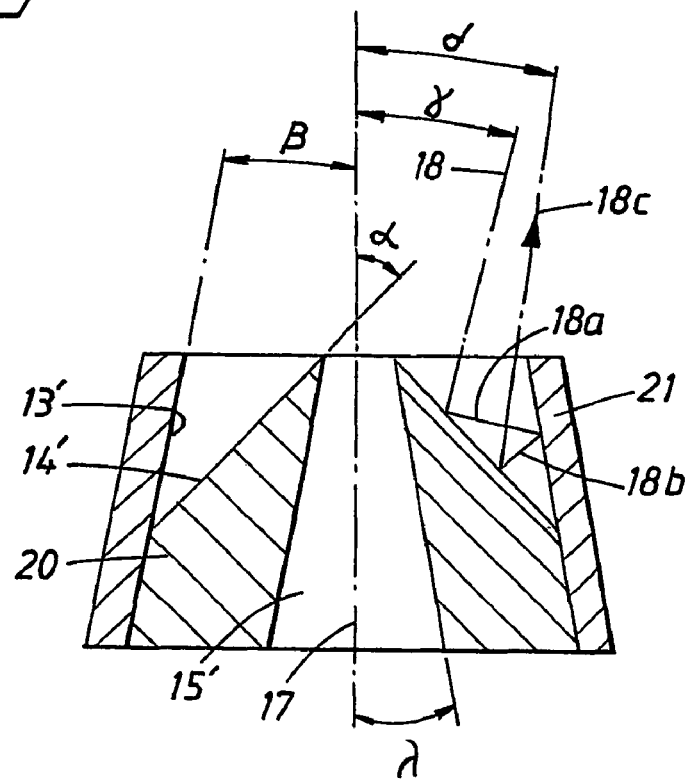
FIG. 2 shows in vertical section a mirror surface arrangement for dealing with the unwanted beams in question and for eliminating the effects of the same.

FIG. 2 shows the construction of an embodiment with reflective surfaces 13', 14'. The device corresponding to the unit 12 according to FIG. 1 is here divided into a first and a second unit 20, 21. The first unit 20 is in the shape of a pyramid with an opening 15' that goes right through, which opening is the shape of a truncated pyramid, the sides of which form angles λ to the longitudinal axis 17. The unit 20 comprises four outer surfaces that constitute mirror surfaces, 14'. The second unit 21 is designed as an internal truncated pyramid, around the longitudinal axis 17, where the four inner surfaces 13' are mirror surfaces. In FIG. 2 only one surface 13' and one surface 14' are shown for the sake of clarity. The outer part of the first unit 20 and the inner part of the second unit 21 meet at the lower part of the device. In this way, a V-shaped channel is produced with reflective edges. The pyramid does not need to be limited to having four sides. Alternatively, the pyramid can be replaced by some other shape or by a cone. The reflective surfaces 14' of the unit 20 form the angle α to the longitudinal axis 17. α can be of the order of 30°. The reflective surfaces 13' of the unit 21 form the angle β to the longitudinal axis 17. The angle β can be of the order of 10°. FIG. 2 shows an alternative incident beam in relation to the embodiment according to FIG. 1. In this case, the incident beam is indicated by a broken line 18. The beam is reflected towards a surface in question 14' and continues according to 18a, is reflected to a surface in question 13' and continues according to 18b and is reflected again towards the surface 14' and continues out of the device according to 18c. It is recognized that a considerable reduction can be obtained in the incident beam by means of the three reflections, twice on surface 14' and once on surface 13'. In the figure, the incoming beam is at an angle γ and the outgoing beam is at an angle δ to the longitudinal axis 17. The two angles are different and can be varied in the arrangement.

Figure 3:
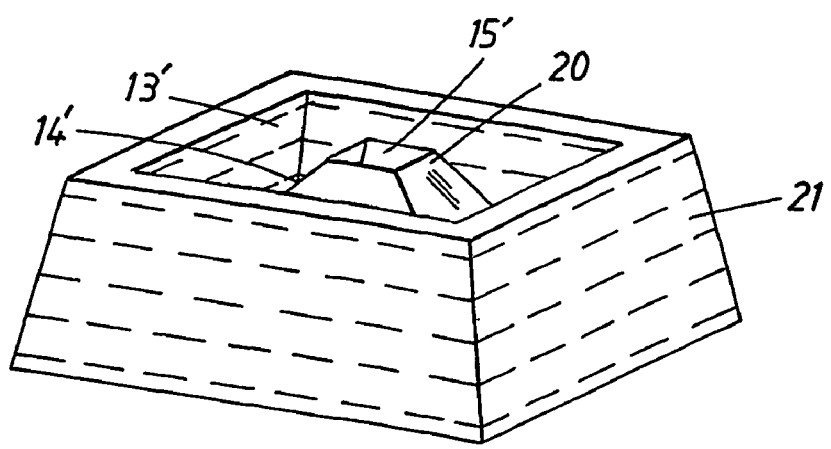
FIG. 3 shows an example of the design of the light trap, viewed in perspective and from above.

FIG. 3 shows the first and the second unit 20 and 21 with the mirror surfaces 14' and 13' respectively. In one embodiment, the embodiment described above as a truncated pyramid is, in principle, interchangeable with cone shapes for the unit, surfaces, openings, etc. It is also recognized that combinations of the two embodiments can be used. It is also recognized that the surface arrangement in question can be arranged in such a way that a practically total local elimination of the stray light or the incoming beam 11, 18 is achieved. Respective mirror surfaces can be provided with a coating of a known type, for example an absorbent layer coated with an anti-reflective coating, a so-called "black mirror".

The invention is not limited to the embodiments described above by way of example, but can be modified within the framework of the subsequent claims and concept of the invention.

The invention claimed is:

1. A device for an optical system (1) that works with an intermediate image and comprises:

a stop (5) with an associated aperture (6) through which light passes completely through the device, a light-reducing or light-absorbing arrangement located along a side of the aperture (6), said arrangement being arranged to reduce considerably or eliminate completely light (11, 18) incident to the side of the aperture, and thereby reduce or eliminate stray light and reflections, characterized in that in the case with the reflection of the light, a surface arrangement is arranged with its surfaces at an angle to each other that results in reflection in a controlled direction or directions, characterized in that the surface arrangement comprises at least two different surfaces or surface arrangements arranged to produce at least two or three reflections of the light (11, 18) incident to the side of the aperture (6), characterized in that the light-reflecting or light-absorbing arrangement comprises a first part (20) that is arranged with the said aperture (6) and with one or more external first light-reflecting surfaces (14') an a second part (21) that has one or more internal second light-reflecting surfaces (13'), and characterized in that one or more first light-reflecting surfaces are in the shape of outer cones and one or more second light-reflecting surfaces are in the shape of inner cones, the half cone angles for the surfaces being unequal.

2. A device for an optical system (1) that works with an intermediate image and comprises:

a stop (5) with an associated aperture (6) through which light passes completely through the device, a light-reducing or light-absorbing arrangement located along a side of the aperture (6), said arrangement being arranged to reduce considerably or eliminate completely light (11, 18) incident to the side of the aperture, and thereby reduce or eliminate stray light and reflections, characterized in that in the case with the reflection of the light, a surface arrangement is arranged with its surfaces at an angle to each other that results in reflection in a controlled direction or directions, characterized in that the surface arrangement comprises at least two different surfaces or surface arrangements arranged to produce at least two or three reflections of the light (11, 18) incident to the side of the aperture (6), characterized in that the light-reflecting or light-absorbing arrangement comprises a first part (20) that is arranged with the said aperture (6) and with one or more external first light-reflecting surfaces (14') and a second part (21) that has a one or more internal second light-reflecting surfaces (13'), and characterized in that one or more reflecting first surfaces are located on a unit (20) in the shape of a truncated pyramid, and in that one or more second light-reflecting surfaces are located on an outer part (21) of the pyramidal unit, with the second light-reflecting surface (s) being opposite the first surface(s), the angles of inclination of the first and second light-reflecting surfaces being unequal.

3. A stray-light reducing optical system having a reduced probability of detection by an external sensor, the system comprising:

an optical lens that provides an intermediate image;

a stop having an aperture through which a portion of the intermediate image passes;

a V-shaped channel located at a light-incident side of the stop adjacent to the aperture, wherein walls of the V-shaped channel are configured to provide said reduced probability of detection by an external sensor by reducing stray light and reflections back through the optical lens, wherein the V-shaped channel comprises a first part having one or more external first light-reflecting surfaces, and a second part having one or more internal second light-reflecting surfaces, wherein the one or more external first light-reflecting surfaces are located on a unit having a shape of a truncated pyramid, wherein the one or more internal second light-reflecting surfaces are located on an outer part of the truncated pyramid opposed to the one or more external first light-reflecting surfaces, wherein angles of inclination of the first and second light-reflecting surfaces are unequal.

4. The system of claim 3, wherein the walls of the V-shaped channel comprise light-reflecting surfaces having a coating thereon that provides a relatively low reflection of light from the intermediate image incident on the light-incident side of the aperture.

5. The system of claim 3, wherein the walls of the V-shaped channel comprise light-absorbing surfaces that absorb light from the intermediate image incident on the light-incident side of the aperture.

6. The system of claim 3, wherein the walls of the V-shaped channel are arranged at an angle to each other so as to provide light reflection in one or more controlled directions.

7. The system of claim 3, wherein the walls of the V-shaped channel are arranged to produce at least two reflections of the light from the intermediate image incident on the light-incident side of the aperture.

8. The system of claim 3, wherein the walls of the V-shaped channel are arranged to produce three reflections of the light from the intermediate image incident on the light-incident side of the aperture.

9. A stray-light reducing optical system having a reduced probability of detection by an external sensor, the system comprising:

an optical lens that provides an intermediate image;

a stop having an aperture through which a portion of the intermediate image passes;

a light-trap around the aperture, wherein the light trap comprises a first part having one or more external first light-reflecting surfaces, and a second part having one or more internal second light-reflecting surfaces, wherein said one or more external first light-reflecting surfaces are in the shape of outer cones, and said one or more internal second light-reflecting surfaces are in the shape of inner cones, wherein half cone angles for the first light-reflecting surface and the second light-reflecting surface are unequal.

10. A stray-light reducing optical system having a reduced probability of detection by an external sensor, the system comprising:

an optical lens that provides an intermediate image;

a stop having an aperture through which a portion of the intermediate image passes;

a light-trap around the aperture, wherein the light trap comprises a first part having one or more external first light-reflecting surfaces, and a second part having one or more internal second light-reflecting surfaces, wherein the one or more external first light-reflecting surfaces are located on a unit having a shape of a truncated pyramid, wherein the one or more internal second light-reflecting surfaces are located on an outer part of the truncated pyramid opposed to the one or more external first light-reflecting surfaces, wherein angles of inclination of the first and second light-reflecting surfaces are unequal.

11. A stray-light reducing optical system having a reduced probability of detection by an external sensor the system comprising:

an optical lens that provides an intermediate image;

a stop having an aperture through which a portion of the intermediate image passes;

a light-trap around the aperture, wherein the light trap comprises a first part having one or more external first light-reflecting surfaces, and a second part having one or more internal second light-reflecting surfaces, wherein an inner part having the one or more external first light-reflecting surfaces is arranged with the aperture passing therethrough, said aperture being configured to widen out towards a lower section of the inner part.

12. The system of claim 11, wherein the aperture comprises an opening having a square cross-section.

* * * * *